(12) United States Patent
Kwon et al.

(10) Patent No.: US 10,696,143 B2
(45) Date of Patent: Jun. 30, 2020

(54) APPARATUS OF IMPROVING VEHICLE INDOOR AIR QUALITY BY USING AIR DUST CONCENTRATION DATA CORRECTED FROM THE OUTSIDE OF VEHICLE AND PURIFYING VEHICLE INDOOR AIR

(71) Applicants: Hyundai Motor Company, Seoul (KR); Kia Motors Corporation, Seoul (KR)

(72) Inventors: Dong Ho Kwon, Bonghwa-eup (KR); Gee Young Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 15/708,646

(22) Filed: Sep. 19, 2017

(65) Prior Publication Data
US 2018/0281566 A1  Oct. 4, 2018

(30) Foreign Application Priority Data

Apr. 4, 2017  (KR) .................. 10-2017-0043735

(51) Int. Cl.
*B60H 3/06* (2006.01)
*B60H 1/00* (2006.01)
(Continued)

(52) U.S. Cl.
CPC .............. *B60H 3/06* (2013.01); *B60H 1/008* (2013.01); *B60H 1/00828* (2013.01);
(Continued)

(58) Field of Classification Search
CPC ............ B60H 1/00678; B60H 1/00857; B60H 1/0065; B60H 1/008; B60H 1/00849; B60H 1/00764; B60H 1/00828; B60H 1/00985; B60H 3/06; F24F 3/1603; F24F 11/0017; F24F 11/08; F24F 11/30;
(Continued)

(56) References Cited

U.S. PATENT DOCUMENTS 5,725,425 A * 3/1998 Rump .................... B60H 1/008
                                                   165/249
5,775,415 A * 7/1998 Yoshimi ............. B60H 1/00821
                                                   165/202
(Continued)

FOREIGN PATENT DOCUMENTS

JP       2009-126218 A    6/2009
KR   10-2010-0027461 A    3/2010
(Continued)

*Primary Examiner* — Chun Cao
(74) *Attorney, Agent, or Firm* — Morgan, Lewis & Bockius LLP

(57) ABSTRACT

An apparatus for improving vehicle indoor air quality, may include a controller configured to correct and verify air dust concentration data; determine dust concentration outside a vehicle based on the verified data; and control an operation mode of an air conditioning device according to the determination; and the air conditioning device, wherein an operation of an intake door configured to control an introduction of outdoor air into the vehicle is controlled in response to signals of the controller.

9 Claims, 2 Drawing Sheets

(51) Int. Cl.
*F24F 3/16* (2006.01)
*F24F 110/50* (2018.01)
*F24F 110/52* (2018.01)
*F24F 11/30* (2018.01)
*F24F 110/64* (2018.01)

(52) U.S. Cl.
CPC ....... *B60H 1/00849* (2013.01); *F24F 3/1603* (2013.01); *F24F 11/30* (2018.01); *F24F 2110/50* (2018.01); *F24F 2110/52* (2018.01); *F24F 2110/64* (2018.01)

(58) Field of Classification Search
CPC ....... F24F 2011/0019; F24F 2011/0023; F24F 2110/50; F24F 2110/52; F24F 2110/64
See application file for complete search history.

(56) References Cited

U.S. PATENT DOCUMENTS

| | | | | |
|---|---|---|---|---|
| 5,946,923 | A * | 9/1999 | Samukawa | B60H 1/00764 165/249 |
| 6,168,515 | B1 * | 1/2001 | Daimon | B60H 1/008 165/249 |
| 6,800,022 | B2 * | 10/2004 | Urbank | B60H 1/008 454/139 |
| 7,803,039 | B2 * | 9/2010 | Inoue | B60H 1/008 165/249 |
| 9,688,194 | B2 * | 6/2017 | MacNeille | G05B 15/02 |
| 10,112,618 | B2 * | 10/2018 | Borrel | B60W 40/02 |
| 10,195,921 | B2 * | 2/2019 | Wagner | B60H 1/00764 |
| 2007/0243808 | A1 * | 10/2007 | Mathur | B60H 1/00764 454/75 |
| 2008/0041138 | A1 * | 2/2008 | Marra | B60H 1/008 73/31.02 |
| 2009/0312905 | A1 * | 12/2009 | Marra | B60H 1/00792 701/36 |
| 2019/0056138 | A1 * | 2/2019 | Lee | B01D 46/44 |

FOREIGN PATENT DOCUMENTS

| | | |
|---|---|---|
| KR | 10-2012-0131931 A | 12/2012 |
| KR | 10-2014-0134347 A | 11/2014 |
| KR | 10-1469675 B1 | 12/2014 |

* cited by examiner

APPARATUS OF IMPROVING VEHICLE INDOOR AIR QUALITY BY USING AIR DUST CONCENTRATION DATA CORRECTED FROM THE OUTSIDE OF VEHICLE AND PURIFYING VEHICLE INDOOR AIR

CROSS-REFERENCE TO RELATED APPLICATION

The present application claims priority to Korean Patent Application No. 10-2017-0043735 filed on Apr. 4, 2017, the entire contents of which is incorporated herein for all purposes by this reference.

BACKGROUND OF THE INVENTION

Field of the Invention

The present invention relates to an apparatus for improving vehicle indoor air quality, and more particularly, to an apparatus for improving vehicle indoor air quality, the apparatus using air dust concentration data corrected from the outside and purifying vehicle indoor air.

Description of Related Art

In general, a vehicle is provided with an air conditioning system to maintain cleanness of air inside the vehicle. When the air inside the vehicle is required to ventilate while the vehicle travels, it is necessary to open a door window or to introduce air into the vehicle from the outside thereof using the air conditioning system. In this case, the air conditioning system includes an air filter for filtering foreign substances such as dust contained in the air blown into the vehicle.

In recent years, the dust inside the vehicle is removed using the air filter by controlling the operation mode of the air conditioning system, based on the measured value of a dust detector mounted to the vehicle.

However, the price of the dust detector is increased as the measurement performance thereof is increased. Hence, the installation of high-performance dust detectors to increase dust removal performance in the vehicle causes an increase in costs to manufacture the vehicle.

If low-price and low-performance dust detectors are used in the vehicle, dust may not be removed by the air conditioning system when there is a need to remove dust inside the vehicle, or dust may be removed by the air conditioning system when there is no need to remove dust inside the vehicle. For this reason, the consistency of operation of the air conditioning system may be deteriorated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus for improving indoor vehicle indoor air quality. The apparatus uses air dust concentration data corrected from the outside and purifies vehicle indoor air and includes a controller which corrects and verifies the air dust concentration data to determine dust concentration outside a vehicle and controls an operation mode of an air conditioning device according to the determination, facilitating controlling the operation mode of the air conditioning device without an outdoor dust detector and improving efficiency of the air conditioning device to keep the vehicle indoor air quality high. outdoor dust sensor Various aspects of the present invention are directed to providing an apparatus for improving vehicle indoor air quality includes a controller configured to correct air dust concentration data from the outside to verify the data; determine dust concentration outside a vehicle based on the verified air dust concentration data; and control an operation mode of an air conditioning device according to the determination, and the air conditioning device in which an operation mode of an intake door for controlling introduction of outdoor air into the vehicle is controlled in response to signals of the controller.

The controller may verify the air dust concentration data on the basis of a position and an hour at which the data is measured. When a distance between a location of the vehicle during verifying the data and the position at which the data is measured is less than a predetermined distance and a difference between time of verifying the data and the hour at which the data is measured is less than a predetermined time, the controller may determine that the air dust concentration data is verified.

The controller may prioritize the position over the hour to verify the data.

The controller may use verified one of validity of road dust concentration data and atmospheric dust concentration data, as the air dust concentration data to determine the dust concentration outside the vehicle. The controller may prioritize the road dust concentration data over the atmospheric dust concentration data to verify the data.

When the controller determines based on the verified air dust concentration data that the dust concentration outside the vehicle is as much as high to block introduction of outdoor air into the vehicle the intake door may be operated in an indoor air mode to block the introduction of outdoor air into the vehicle.

When the controller determines based on the verified air dust concentration data that the dust concentration outside the vehicle is low enough not to block introduction of outdoor air into the vehicle, the intake door may be maintained in an operation mode having been turned on before the air dust concentration data is verified.

When the controller determines that dust concentration inside the vehicle is high to remove dust, the air conditioning device may enter a dust removal mode regardless of the dust concentration outside the vehicle. When the air conditioning device enters the dust removal mode, the indoor air mode of the intake door is turn on to block the instruction of outdoor air into the vehicle and a blower and a cooler may be operated to make the vehicle indoor air circulate through an air filter of the cooler. The higher an operation stage of the blower is before the air conditioning device enters the dust removal mode, the more effectively dust inside the vehicle is removed.

By controller, information on the dust concentration inside the vehicle and information on the dust concentration outside the vehicle, which are determined based on the verified air dust concentration data, are shown on a display in the vehicle for a driver and passengers.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
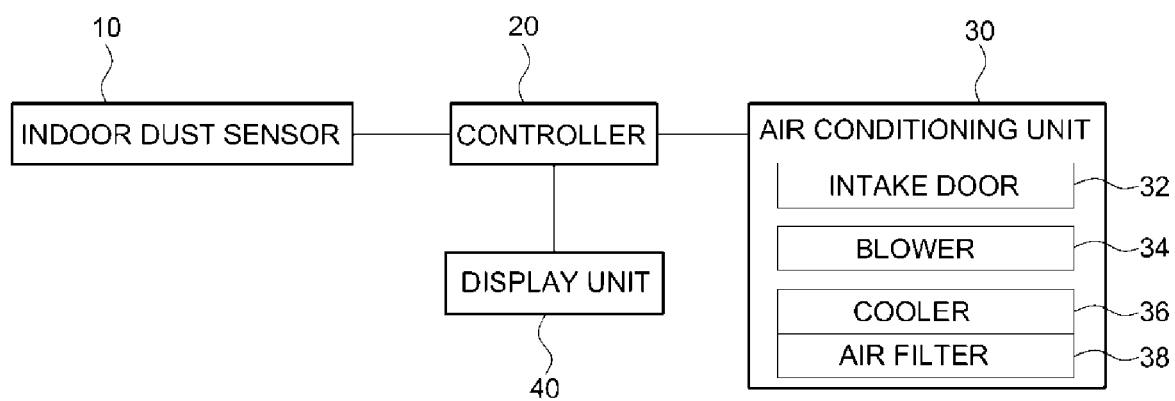
FIG. 1 is a block diagram illustrating an apparatus for improving vehicle indoor air quality according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIG. 1, an apparatus for improving vehicle indoor air quality according to an exemplary embodiment of the present invention includes an indoor dust detector 10 that detects dust concentration inside a vehicle, a controller 20 that determines dust concentration outside the vehicle using air dust concentration data, which is verified, an air conditioning device 30 that allows air inside the vehicle to be clean, and a display device 40 that outputs and displays information related to the dust concentration inside and outside the vehicle.

The indoor dust detector 10 is disposed in the vehicle to measure the dust concentration inside the vehicle, and begins to operate when the vehicle is started, to measure and transmit the dust concentration inside the vehicle to the controller 20 in real time.

The controller 20 is a controller that may directly or indirectly control an operation mode of the air conditioning device 30 as one of one of controllers disposed in the vehicle. The controller 20 determines whether or not the dust concentration inside the vehicle is much as high to remove dust, based on the signal transmitted from the indoor dust detector 10. The controller 20 allows the air conditioning device 30 to enter a dust removal mode when the dust concentration inside the vehicle is determined to be high, and controls the operation mode of the air conditioning device 30 based on the dust concentration outside the vehicle when the dust concentration inside the vehicle is determined to be low enough not to remove dust.

Here, the high or low dust concentration inside the vehicle may be determined according to the predetermined dust predetermined dust concentration.

The air conditioning device 30 includes an intake door 32 that controls introduction of outdoor air into the vehicle, a blower 34 that introduces air outside the air conditioning device 30 to blow the air into the vehicle, a cooler 36 that cools the air introduced into the air conditioning device, and an air filter 38 that removes foreign substances contained in the air passing through the cooler 36.

The intake door 32 is disposed in the air conditioning device 30 to simultaneously open or close an outdoor air inlet for introducing air outside the vehicle and an indoor air inlet for introducing air inside the vehicle. When the intake door is operated in an outdoor air mode, the outdoor air inlet is fully (100%) open while the indoor air inlet is fully closed such that only air outside the vehicle is introduced into the air conditioning device 30. When the intake door is operated in an indoor air mode, the outdoor air inlet is fully closed while the indoor air inlet is fully open such that only air inside the vehicle is introduced into the air conditioning device 30. When the intake door is operated in an inside/outdoor air mode (or a mixed mode), the outdoor air inlet and the indoor air inlet are partially open at the same time such that all the air outside and inside the vehicle is introduced into the air conditioning device 30.

The air filter 38 is formed integrally with the cooler 36, or is disposed upstream or downstream of the cooler 36 in an air flow direction in the air conditioning device 30 to remove foreign substances in the air blown into the vehicle through the cooler 36.

When the air conditioning device 30 enters the dust removal mode in response to the signal of the controller 20, the blower 34 and the cooler 36 are operated so that air inside the vehicle is circulated through the air filter 38 in a state in which the intake door 32 is operated in the indoor air mode to block the introduction of outdoor air into the vehicle, to effectively remove dust mixed in the air inside the vehicle.

In more detail, when the intake door 32 is operated in the indoor air mode so that the outdoor air inlet of the air conditioning device 30 is closed and the indoor air inlet is opened, only air inside the vehicle is introduced into the air conditioning device 30 through the indoor air inlet. In the instant case, when the cooler 36 is turned on together with the blower 34, air flows to the cooler 36 by the blower 34 in the air conditioning device 30 so that the air passing through the cooler 36 is blown into the vehicle through the air filter 38. Consequently, it is possible to remove dust contained in the vehicle indoor air introduced into the air conditioning device 30.

The higher an operation stage of the blower 34 is when the air conditioning device 30 enters the dust removal mode, the more effectively dust inside the vehicle is removed.

That is, the higher the operation stage of the blower 34 is when the air conditioning device 30 enters the dust removal mode, the more effectively and rapidly dust is removed by increasing circulation velocity of air inside the vehicle.

In addition, when the dust concentration inside the vehicle is determined to be low, the controller 20 controls the operation modes of the intake door 32, the blower 34, and the cooler 36 based on the dust concentration outside the vehicle in the air conditioning device 30.

In the instant case, the dust concentration outside the vehicle is not determined based on the dust concentration value detected by an outdoor outdoor dust sensor, but is determined using the air dust concentration data corrected from an external institution, an externally designated institution, or the like.

Hereinafter, the process of determining the dust concentration outside the vehicle using the air dust concentration data corrected from the outside and of controlling the operation mode of the air conditioning device 30 according to the determination by the controller 20 will be described with reference to FIG. 2.

Figure 2:
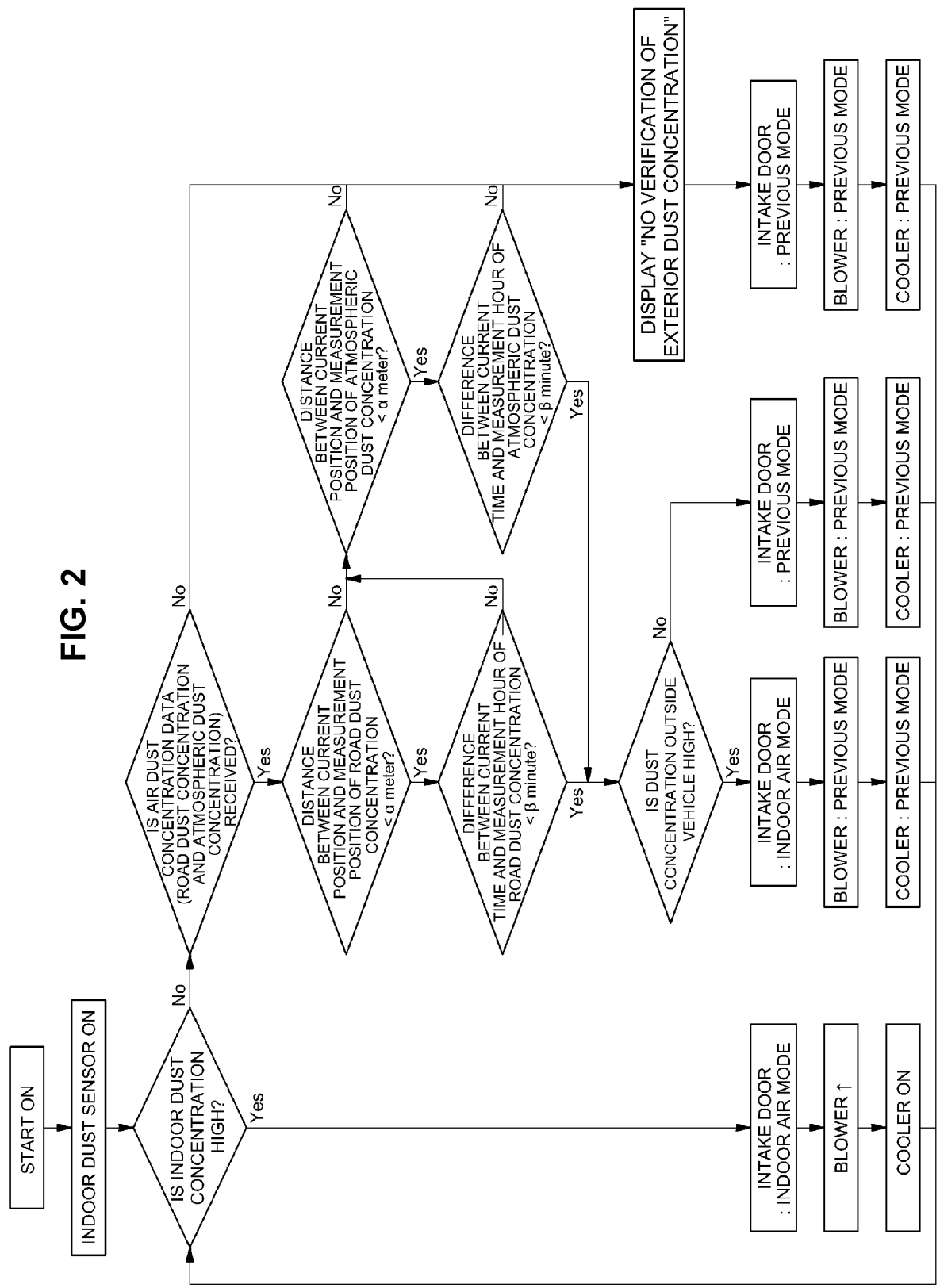
FIG. 2 is a flowchart illustrating a method of improving vehicle indoor air quality according to another exemplary embodiment of the present invention.

As illustrated in FIG. 2, when the vehicle is started and the controller 20 receives dust concentration inside the vehicle in real time from the indoor dust detector 10, the controller 20 first determines whether or not it is necessary to remove dust inside the vehicle based on the real-time dust concentration inside the vehicle.

When the dust concentration inside the vehicle is as much as high to remove dust inside the vehicle, the air conditioning device 30 enters the above-mentioned dust removal mode to remove dust in the air inside the vehicle.

When the dust concentration inside the vehicle, i.e. the real-time dust concentration inside the vehicle is not as much as high to remove dust inside the vehicle, namely when the real-time dust concentration inside the vehicle is not higher than the predetermined dust concentration, the controller 20 determines whether or not to receive air dust concentration data.

When the air dust concentration data is received, the controller 20 verifies the received air dust concentration data before determining the operation mode of the air conditioning device 30 based on the air dust concentration data, to determine whether the air dust concentration data is suitable for use to estimate dust concentration outside the vehicle or the high or low dust concentration.

The air dust concentration data may be provided and corrected from a place where the dust concentration scattered in the atmosphere is measured in real time, and may include, for example, road dust concentration data and atmospheric dust concentration data.

The road dust concentration means dust concentration re-scattered in the atmosphere on the road by the traveling of the vehicle, wind, etc., and uses a value of mean concentration measured in the atmosphere (which is substantially equal to or lower than a vehicle body) on the surface of the road.

The road dust concentration is a concentration obtained by measuring dust, which is re-scattered on the road and occurs in the atmosphere close to the surface of the road, in real time using a mobile road dust measurement device moving in a fixed region. The road dust concentration may be corrected from, for example, a public institution including an environmental management corporation or an officially designated institution.

The atmospheric dust concentration means a dust concentration scattered in the atmosphere, and uses a value of dust concentration measured at a certain height from the ground.

The atmospheric dust concentration is a concentration obtained by measuring dust, which is scattered in the atmosphere of a certain height from the ground, every certain time interval using an atmospheric dust measurement device disposed at a fixed place. The atmospheric dust concentration may be corrected from, for example, a public institution including a public office or an environment department of a local government, or an officially designated institution.

The air dust concentration data including the road dust concentration and the atmospheric dust concentration is a value of dust concentration according to a position and an hour at which the data is measured and is updated in real time. The controller receives and acquires the air dust concentration data as a value of dust concentration according to a measurement position and a measurement hour.

When the controller 20 acquires the air dust concentration data, the controller 20 distinguishes data (i.e. proximity data), measured at the nearest position from a current position at which the vehicle travels in real time (i.e. a real-time position of the vehicle), from the corrected air dust concentration data, selects the latest measured proximity data when the number of pieces of proximity data is two or more, and determines whether or not the data selected from the corrected air dust concentration data is suitable for use to estimate a dust concentration outside the vehicle.

That is, when the controller 20 acquires the air dust concentration data, the controller 20 selects the latest measured proximity data at the nearest position from the real-time position of the vehicle from the corrected air dust concentration data, and determines whether or not the selected air dust concentration data is suitable for use to estimate the dust concentration outside the vehicle.

To determine whether or not the selected air dust concentration data is suitable for use to estimate the dust concentration outside the vehicle, the selected air dust concentration data is verified on the basis of the measurement position and time of the selected air dust concentration data.

When the selected air dust concentration data is verified, the road dust concentration data has a priority from among the road dust concentration data and the atmospheric dust concentration data and the measurement position has a priority from among the measurement position and the measurement hour, considering the air dust concentration data used to estimate the dust concentration outside the traveling vehicle or the high or low dust concentration.

In other words, the controller 20 uses one, which is verified, from among the road dust concentration data and the atmospheric dust concentration data, as the air dust concentration data to determine the dust concentration outside the vehicle or the high or low dust concentration, verifies data while putting a priority on the road dust concentration data among them, and first verifies the measurement position from among the measurement position and the measurement hour when verifying each piece of data.

When the road dust concentration data and the atmospheric dust concentration data are received, the controller first verifies the road dust concentration data, as illustrated in FIG. 2. In the instant case, the controller primarily verifies the selected road dust concentration data on the basis of the measurement position thereof, and secondarily verifies the selected road dust concentration data on the basis of the measurement hour thereof.

In more detail, in the case where the controller 20 verifies the selected road dust concentration data, the controller 20 first determines whether or not the distance between the real-time position of the vehicle when the selected road dust concentration data is verified and the measurement position of the selected road dust concentration data is less than a predetermined reference distance a, to primarily verify the selected road dust concentration data, and then determines whether or not the difference between the time when the selected road dust concentration data is verified and the measurement hour of the selected road dust concentration data is less than a predetermined reference time β, to secondarily verify the selected road dust concentration data.

In the instant case, the secondary verification is performed when the selected road dust concentration data is verified as a result of the primary verification, and the selected road dust concentration data is finally determined to be valid when the selected road dust concentration data is verified as a result of the secondary verification.

That is, the selected road dust concentration data is determined to be valid only when satisfying all of a condition (first condition), in which the distance between the real-time position of the vehicle when the selected road dust concentration data is verified and the measurement position of the selected road dust concentration data is less than the predetermined reference distance a, and a condition (second condition) in which the difference between the time when the selected road dust concentration data is verified and the measurement hour of the selected road dust concentration data is less than the predetermined reference time β. When one of the two conditions is not satisfied, the selected road dust concentration data is determined to be invalid. In the instant case, when the first condition is not satisfied, the atmospheric dust concentration data is immediately verified without the verification of the second condition.

Here, the reference distance a and the reference time may be set as values derived by previous tests and evaluation.

The method similar to the verification of the road dust concentration data is applied to when the atmospheric dust concentration data is verified. The controller selects the latest measured atmospheric dust concentration data at the nearest position considering the real-time position and current time of the vehicle when the atmospheric dust concentration data is verified, primarily verifies the selected atmospheric dust concentration data on the basis of the measurement position thereof, and secondarily verifies the selected atmospheric dust concentration data on the basis of the measurement hour thereof.

The selected atmospheric dust concentration data is determined to be valid only when satisfying all of a condition (first condition), in which the distance between the real-time position of the vehicle when the selected atmospheric dust concentration data is verified and the measurement position of the selected atmospheric dust concentration data is less than a reference distance a, and a condition (second condition) in which the difference between the time when the selected atmospheric dust concentration data is verified and the measurement hour of the selected atmospheric dust concentration data is less than a reference time β. When one of the two conditions is not satisfied, the selected atmospheric dust concentration data is determined to be invalid. In the instant case, when the first condition is not satisfied, the atmospheric dust concentration data is immediately determined to be invalid without the verification of the second condition, and the display device 40 in the vehicle displays a content of "no verification of dust concentration outside vehicle" such that a driver and passengers check the content.

Here, the reference distance a and the reference time may be determined as values derived by previous tests and evaluation. The reference distance and the reference time for verifying the road dust concentration data may be determined differently from the reference distance and the reference time for verifying the atmospheric dust concentration data.

Since air dust concentration data is verified on the basis of the measurement position and the measurement hour, it may be determined that the air dust concentration data, which is verified, is proximity and up to date to the real-time position of the vehicle. Accordingly, it is possible to obtain consistency for estimating the dust concentration outside the vehicle or the high or low dust concentration using the air dust concentration data, which is verified, and to increase consistency when the operation mode of the air conditioning device 30 is controlled according to the high or low dust concentration outside estimated the vehicle using the air dust concentration data.

Meanwhile, the controller 20 estimates the high or low dust concentration outside the vehicle based on the air dust concentration data, which is verified, and operates the intake door 32 for controlling the introduction of outdoor air into the vehicle in the indoor air mode when the dust concentration outside the vehicle is as much as high to block the introduction of outdoor air into the vehicle, to block the introduction of outdoor air through the air conditioning device 30.

Accordingly, before the high or low dust concentration outside the vehicle is determined based on the air dust concentration data, which is verified, the operation mode of the intake door 32 is maintained in the indoor air mode when the intake door 32 is being operated in the indoor air mode, and the operation mode of the intake door 32 is changed to the indoor air mode when the intake door 32 is being operated in the outdoor air mode or the inside/outdoor air mode.

In the instant case, the operation modes of the blower 34 and the cooler 36 are maintained in previous modes. The operation modes of the blower 34 and the cooler 36 are maintained in operation modes before the air dust concentration data is verified, or in operation modes before the high or low dust concentration outside the vehicle is determined based on the air dust concentration data, which is verified. When the previous operation modes of the blower 34 and the cooler 36 are ON modes, the air inside the vehicle is circulated while passing through the air filter 38.

When the controller 20 determines that the dust concentration outside the vehicle is lower than the level required to block the introduction of outdoor air into the vehicle as a result of determining the high or low dust concentration outside the vehicle based on the air dust concentration data, which is verified, the operation modes of the intake door 32, the blower 34, and the cooler 36 are maintained in operation modes before the air dust concentration data is verified.

Meanwhile, even when the controller does not receive the air dust concentration data, the display device 40 of the vehicle displays a content of "no verification of dust concentration outside vehicle" such that a driver and passengers check the content, similar to when the air dust concentration data (road dust concentration data and atmospheric dust concentration data) is determined to be invalid, and the operation modes of the intake door 32, the blower 34, and the cooler 36 are maintained in operation modes before the air dust concentration data is verified.

In addition, the display device 40 displays information on the dust concentration outside the vehicle, determined based on the air dust concentration data, which is verified, to inform the information related to passengers (including a driver). Thus, it is advantageous to allow vehicle indoor air to be clean and to improve vehicle indoor air quality.

For example, when the dust concentration outside the vehicle is determined to be low based on the air dust concentration data, it is possible to allow passengers to open the closed door window. In addition, when the dust concentration outside the vehicle is determined to be high based on the air dust concentration data, it is possible to allow passengers to close the open door window. As a result, vehicle indoor air quality is improved.

In addition, the display device 40 may classify and display the high or low dust concentration inside the vehicle in a multistage manner, and simultaneously display whether or not the air conditioning device 30 enters the dust removal mode, so that the passengers check the indoor air quality in the vehicle and the operation mode of the air conditioning device 30.

The display device 40 uses a vehicle indoor device including a cluster inside the vehicle, which may visually output vehicle-related information.

As is apparent from the above description, an apparatus for improving vehicle indoor air quality according to an exemplary embodiment of the present invention has the following advantages.

The apparatus can determine a dust concentration outside a vehicle based on air-dust concentration data, which is verified, and control an operation mode of an air conditioning device according to a result of the determination, facilitating air inside the vehicle to keep clean in consideration of the dust concentration outside the vehicle without installation of an outdoor dust detector outside the vehicle and facilitating the consistency of the operation mode of the air conditioning device to be improved to maintain cleanness of air inside the vehicle.

After corrected air-dust concentration data is verified based on a measurement position and a measurement hour, a dust concentration outside the vehicle is determined based on the verified air-dust concentration data to determine the dust concentration outside the vehicle based on the air-dust concentration data optimally matched with a real-time position and a current time at which the vehicle is traveling. Thus, it is possible to more accurately estimate the dust concentration outside the traveling vehicle in real time.

Since there is no need to install an outdoor dust detector for measuring an external dust concentration, it is possible to reduce costs and improve fuel efficiency.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. the exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus to improve vehicle indoor air quality, comprising:
a controller configured to verify air dust concentration data provided from an institution separately disposed outside a vehicle and of measuring an air dust concentration, to determine dust concentration outside the vehicle based on the verified air dust concentration data, and to control an operation of an intake door according to the determination of the dust concentration outside the vehicle; and
an air conditioning device comprising the intake door configured to control an introduction of outdoor air into the vehicle,
wherein the controller is configured to verify the air dust concentration data provided from the institution separately disposed outside the vehicle, based on a position and an hour at which the air dust concentration data is measured, and
wherein, when a distance between a location of the vehicle during verifying the air dust concentration data measured by the institution and the position at which the air dust concentration data is measured by the institution is less than a predetermined distance, and when a difference between time of verifying the air dust concentration data measured by the institution and the hour at which the air dust concentration data is measured by the institution is less than a predetermined time, the controller is configured to determine that the air dust concentration data measured by the institution is verified.

2. The apparatus of claim 1, wherein the controller is configured to prioritize the position over the hour at which the data is measured.

3. The apparatus of claim 1, wherein the controller is configured to utilize verified one of road dust concentration data and atmospheric dust concentration data, as the air dust concentration data to determine the dust concentration outside the vehicle.

4. The apparatus of claim 3, wherein the controller is configured to prioritize the road dust concentration data over the atmospheric dust concentration data to verify the data.

5. The apparatus of claim 1, wherein, when the controller is configured to determine based on the verified air dust concentration data that the dust concentration outside the vehicle is as much as high to block introduction of the outdoor air into the vehicle, the intake door is operated in an indoor air mode to block the introduction of the outdoor air into the vehicle.

6. The apparatus of claim 1, wherein, when the controller is configured to determine based on the verified air dust concentration data that the dust concentration outside the vehicle is low enough not to block introduction of the outdoor air into the vehicle, the intake door is maintained in an operation mode having been turned before the air dust concentration data is verified.

7. The apparatus of claim 1, wherein, when the controller is configured to determine that dust concentration inside the vehicle is high to remove dust, the air conditioning device enters a dust removal mode regardless of the dust concentration outside the vehicle.

8. The apparatus of claim 7, wherein, when the air conditioning device enters the dust removal mode, the outdoor air mode of the intake door is turn on to block the instruction of the outdoor air into the vehicle and a blower and a cooler are operated to make vehicle indoor air circulate through an air filter of the cooler.

9. The apparatus of claim 1, wherein the controller is configured to show the dust concentration outside the vehicle, which is determined by the controller based on the verified air dust concentration data, on a display device in the vehicle.

* * * * *